United States Patent
Duesterberg et al.

(10) Patent No.: US 12,003,582 B2
(45) Date of Patent: Jun. 4, 2024

(54) METHOD FOR TRANSMITTING TEMPORALLY SUCCESSIVE DATASETS OF A POSITION SENSOR VIA AN ETHERNET NETWORK, AND ELECTRICAL DRIVE SYSTEM

(71) Applicant: Lenze SE, Aerzen (DE)

(72) Inventors: Dirk Duesterberg, Emmerthal (DE); Marc Sommer, Pattensen (DE)

(73) Assignee: Lenze SE, Aerzen (DE)

( * ) Notice: Subject to any disclaimer, the term of this patent is extended or adjusted under 35 U.S.C. 154(b) by 310 days.

(21) Appl. No.: 17/453,405

(22) Filed: Nov. 3, 2021

(65) Prior Publication Data
US 2022/0141287 A1    May 5, 2022

(30) Foreign Application Priority Data
Nov. 4, 2020   (DE) ..................... 10 2020 213 881.8

(51) Int. Cl.
*H04L 12/00*    (2006.01)
*H04L 67/12*    (2022.01)

(52) U.S. Cl.
CPC .................................. *H04L 67/12* (2013.01)

(58) Field of Classification Search
CPC .. H04L 67/12; H04L 12/40169; H04W 4/029; H04W 12/033; G06V 20/46
USPC ......................................................... 370/464
See application file for complete search history.

(56) References Cited

U.S. PATENT DOCUMENTS

| | | | |
|---|---|---|---|
| 7,914,468 B2* | 3/2011 | Shalon ................. | A61B 5/0006 600/595 |
| 11,089,988 B2* | 8/2021 | Gupta .................... | A61B 5/726 |
| 11,291,379 B2* | 4/2022 | Paak .................... | A61B 5/0205 |
| 11,606,692 B2* | 3/2023 | Dinan ................. | H04W 12/033 |
| 2014/0062790 A1* | 3/2014 | Letz ....................... | G08G 1/012 342/386 |
| 2020/0229724 A1* | 7/2020 | Gupta ...................... | A61B 5/30 |
| 2021/0397908 A1* | 12/2021 | ElHattab ................ | G06V 20/46 |
| 2022/0133239 A1* | 5/2022 | Gupta ................. | A61B 5/7203 702/19 |
| 2023/0217252 A1* | 7/2023 | Dinan .................. | H04W 4/029 455/422.1 |

(Continued)

FOREIGN PATENT DOCUMENTS

DE    10 2006 024 630 A1    11/2007

OTHER PUBLICATIONS

Forum.arduino.cc: Basic structure for signal transmission with Arduino over LAN, Link: https://forum.arduino.cc/t/grundstruktur-fur-signalubertragung-mit-arduino-uber-lan/283397 (printed on Oct. 28, 2021) (one (1) page).

(Continued)

*Primary Examiner* — Frantz Coby
(74) *Attorney, Agent, or Firm* — Crowell & Moring LLP

(57) ABSTRACT

A method transmits temporally successive datasets of a position sensor via an Ethernet network, wherein a respective dataset of the position sensor consists of a maximum of 4 bits. The method includes the steps of: continuous reading, by a reference component connected to the Ethernet network, of the datasets of the position sensor which are to be transmitted; and continuous writing, by the reference component, of a respective dataset to a 4-bit transmit register of a Media Independent Interface of the reference component.

7 Claims, 1 Drawing Sheet

(56) References Cited

U.S. PATENT DOCUMENTS

2023/0269112 A1* 8/2023 Bar-Niv ............ H04L 12/40169
370/401

OTHER PUBLICATIONS

German-language Office Action issued in German Application No. 10 2020 213 881.8 dated Oct. 28, 2021 with English translation (22 pages).

* cited by examiner

METHOD FOR TRANSMITTING TEMPORALLY SUCCESSIVE DATASETS OF A POSITION SENSOR VIA AN ETHERNET NETWORK, AND ELECTRICAL DRIVE SYSTEM

BACKGROUND AND SUMMARY OF THE INVENTION

The invention relates to a method for transmitting temporally successive datasets of a position sensor via an Ethernet network, and an electrical drive system.

The object of the invention is to provide a method for transmitting temporally successive datasets of a position sensor via an Ethernet network, and an electrical drive system, which enable a transmission of the datasets which is as simple and reliable as possible.

The method serves to transmit temporally successive datasets of a position sensor via an Ethernet network. A respective dataset of the position sensor consists here of a maximum of 4 bits. The position sensor can be designed, for example, as a rotary encoder.

The method comprises the following steps.

A reference component connected to the Ethernet network reads continuously, in particular periodically, the datasets of the position sensor which are to be transmitted.

The reference component writes the read datasets continuously to a 4-bit transmit register of a Media Independent Interface (MII) of the reference component. The 4-bit transmit register typically contains the bits to be transmitted.

The MII can also comprise subvariants, such as, for example, RMII, GMII, RGMII, SGMII, HSGMII, QSGMII and XGMII. The MII is defined in the IEEE 802.3u standard and forms the interface between different types of PHYs (Physical Layer Transceivers) to MACs (Media Independent Interfaces). The 4-bit transmit register serves to accommodate up to four bits to be transmitted which are typically referred to as TXD0, TXD1, TXD2 and TXD3. Reference is otherwise made to the relevant technical literature also.

The 4-bit transmit register or the MB typically forms part of a conventional Ethernet PHY. Reference is made in this respect to the relevant technical literature.

Only the read datasets can be written to the 4-bit transmit register, i.e. no other/further information which further characterizes, for example, a conventional Ethernet frame is written to the 4-bit transmit register.

In one embodiment, the position sensor is an incremental sensor which generates an A-track bit, a B-track bit and a Z-track bit, wherein the A-track bit, the B-track bit and the Z-track bit are written to the 4-bit transmit register, in particular in precisely this sequence.

In one embodiment, a fourth bit of the 4-bit transmit register serves to transmit further payload data.

In one embodiment, the further payload data represent an absolute value, and/or a barcode, and/or a gear factor.

In one embodiment, the data written by means of the reference component to the Ethernet network are received and evaluated by a number of receiver components connected to the Ethernet network.

The electrical drive system is designed to carry out the method described above.

The electrical drive system comprises: an Ethernet network, a position sensor, a reference component coupled with the position sensor and connected to the Ethernet network, and a number of receiver components connected to the Ethernet network.

In one embodiment, the reference component and/or the receiver component is/are frequency converters.

If a transmission with minimal dead time and/or a high number of axes are intended to be implemented in a drive system, the system limits are quickly reached, for example, with an EtherCAT coupling. The two limiting factors, i.e. the number of components and the cycle time, are of no significance if pilot frequency technology is used.

It is possible by means of the invention optionally to transmit a pilot frequency signal, particularly in the form of the encoder datasets, if an Ethernet PHY and Ethernet sockets are available. No additional system lines and special plug-in connections are required to connect the pilot frequency components. Conventional Ethernet lines can be used.

Ethernet PHYs are connected, for example via MIIs (Media Independent Interfaces), to an MAC (Media Access Controller). RMII, GMII and RGMII, for example, are furthermore available. In the case of MII, the PHY requires a TX_EN (Transmit Enable) signal and the nibbles to be transmitted (4-bit values), from which an Ethernet packet is assembled and which are written to the 4-bit transmit register.

Instead of transmitting a (time-limited) Ethernet packet, the PHY is controlled according to the invention in such a way that it permanently supplies data to the Ethernet. The PHY at the receiving end then permanently receives the corresponding nibbles or datasets from the reference component or transmitter and can apply them to its RXD data bus.

These data or datasets can consist, for example, of the A, B and Z track of the position sensor or encoder. These three tracks are thus transmitted continuously from one device to the next. Unnecessary dead times are eliminated since no further protocol is required, and therefore no further cyclical transmissions either.

The customary wire break detection can be represented, for example, from the "link" information, RX_DV and RX_ERROR. This can be transmitted to further slaves in the system by means of TX_EN and TX_ERROR.

The above solution also offers a further line, i.e. the fourth bit in the nibble or 4-bit transmit register bit. An additional channel can thus be represented, for example for the absolute value transmission, for the exchange of line numbers, IDs, here factors, etc.

Even the little residual dead time resulting from the transmission in the PHY can be automatically compensated.

Unlike conventional pilot frequency technology, Ethernet is bidirectional. The last component (identifiable by the absence of a link on its OUT socket) can again transmit back the received data. Each component therefore has the position information or angle information passing back and forth. The time interval, for any component, between the same information elements is the dead time on the most remote (the last) component.

It is furthermore possible by means of this technology to place the pilot frequency master or reference component also in the middle or at the end of a string.

Different frequencies of the respective PHY reference clocks (for example 25 MHz) can be compensated by omitting or doubling the last received nibble.

The invention offers the following advantages:
- Use of established lines and existing hardware (RJ45 cables, EtherCAT system bus) possible
- Virtually no dead time
- Virtually no restriction in the number of components
- Virtually no computing load in the master and slaves No additional costs.

The invention is explained in detail below with reference to the drawings.

DETAILED DESCRIPTION OF THE DRAWINGS

Figure 1:
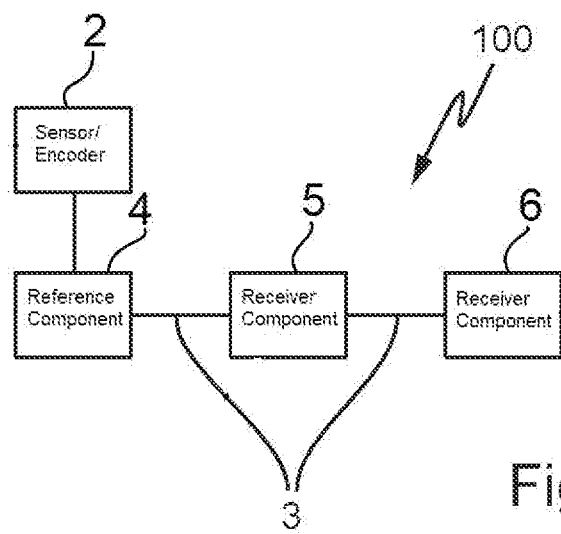
FIG. 1 shows an electrical drive system.

FIG. 1 shows an electrical drive system 100, comprising: a conventional Ethernet network 3, a position sensor or rotary encoder 2, a reference component 4 coupled with the position sensor 2 and with the Ethernet network 3, and a number, here two, of receiver components 5, 6 connected to the Ethernet network 3.

The reference components and/or the receiver components can be frequency converters.

Figure 2:
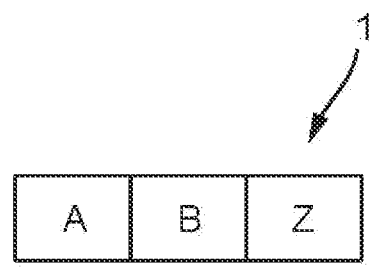
FIG. 2 shows schematically a dataset of a position sensor.

According to the invention, temporally successive datasets 1 of the position sensor 2 are transmitted via the Ethernet network 3, as shown schematically in FIG. 2.

With reference to FIG. 2, a respective dataset 1 of the position sensor 2 consists of an A-track bit, a B-track bit and a Z-track bit.

Figure 3:
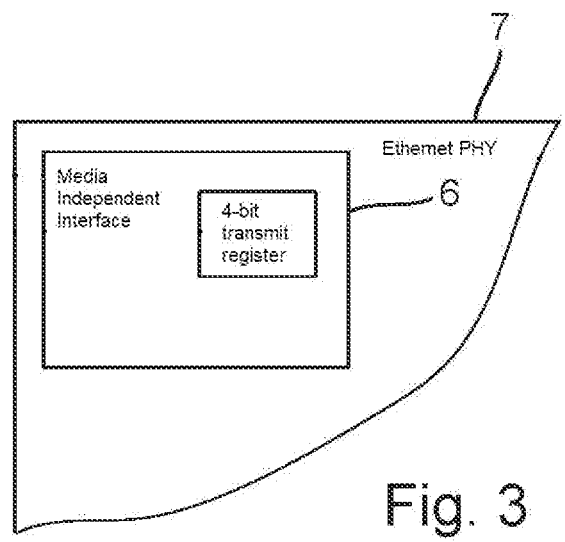
FIG. 3 shows schematically a 4-bit transmit register of a Media Independent Interface of a conventional Ethernet PHY.

The reference component 4 continuously reads the datasets 1 of the position sensor 2 and continuously writes a respective read dataset 1, i.e. the A-track bit, the B-track bit and the Z-track bit, to 4-Bit transmit register 5 of a Media Independent Interface 6 of the reference component 4, as shown schematically in FIG. 3.

The Media Independent Interface 6 can form part of a conventional Ethernet PHY (IC) 7.

A fourth bit of the 4-bit transmit register 5 can serve to transmit further payload data, such as absolute values, and/or can represent bar codes, and/or a gear factor, etc.

The data generated by means of the reference component 4 are received and suitably evaluated by the receiver components 5, 6.

The invention claimed is:

1. A method for transmitting temporally successive datasets of a position sensor via an Ethernet network, wherein a respective dataset of the position sensor consists of a maximum of 4 bits, the method comprising:
    continuous reading, by a reference component connected to the Ethernet network, of the datasets of the position sensor which are to be transmitted; and
    continuous writing, by the reference component, of a respective dataset to a 4-bit transmit register of a Media Independent Interface of the reference component.

2. The method according to claim 1, wherein
    the position sensor is an incremental sensor which generates an A-track bit, a B-track bit and a Z-track bit, and
    the A-track bit, the B-track bit and the Z-track bit are written to the 4-bit transmit register.

3. The method according to claim 2, wherein
    a fourth bit of the 4-bit transmit register serves to transmit further payload data.

4. The method according to claim 3, wherein
    the further payload data represent an absolute value, and/or represent a barcode, and/or represent a gear factor.

5. The method according to claim 2, wherein
    the data transmitted by way of the reference component are received and evaluated by a number of receiver components connected to the Ethernet network.

6. An electrical drive system comprising:
    an Ethernet network;
    a position sensor;
    a reference component coupled with the position sensor and connected to the Ethernet network; and
    a number of receiver components connected to the Ethernet network, wherein
    the electrical drive system operates to transmit temporally successive datasets of the position sensor via the Ethernet network, wherein a respective dataset of the position sensor consists of a maximum of 4 bits, by:
    continuous reading, by the reference component connected to the Ethernet network, of the datasets of the position sensor which are to be transmitted; and
    continuous writing, by the reference component, of a respective dataset to a 4-bit transmit register of a Media Independent Interface of the reference component.

7. The electrical drive system according to claim 6, wherein
    the reference component and/or the receiver components are frequency converters.

* * * * *